Patented Aug. 11, 1953

2,648,656

UNITED STATES PATENT OFFICE 2,648,656

LOW-TEMPERATURE EMULSION POLYMERIZATION OF UNSATURATED ORGANIC COMPOUNDS

Edwin J. Vandenberg, Wilmington, Del., assignor to Hercules Powder Company, Wilmington, Del., a corporation of Delaware No Drawing. Application November 24, 1948, Serial No. 61,918

10 Claims. (Cl. 260—82.5)

This invention relates to an improved process for the polymerization of unsaturated compounds. More particularly, the invention relates to a process for emulsion polymerization of vinyl, vinylidene, and vinylene compounds at temperatures below 0° C.

It is well known that unsaturated compounds, and particularly those which contain the vinyl group may be advantageously polymerized in aqueous emulsion. Thus, synthetic, rubberlike materials have been prepared by the emulsion polymerization of diolefins and by the interpolymerization of diolefinic compounds with other unsaturates such as styrene, acrylic acid esters, acrylonitrile, and like materials. Likewise, such materials as polyvinyl halides, polyvinyl acetate, polystyrene, polymethyl methacrylate and various other addition polymers have been prepared by the emulsion polymerization technique.

The emulsion polymerization of vinyl compounds has customarily been effected at relatively high temperatures. For example, a temperature of about 122° F. has been accepted as a standard for the commercial production of the butadiene-styrene copolymer-type synthetic rubbers. Conventional peroxide catalysts such as potassium persulfate or benzoyl peroxide, and fatty acid soap emulsifying agents such as potassium oleate have normally been employed in such polymerization processes. These prior art emulsion polymerization processes are, however, not as advantageous in some respects as are polymerizations carried out at lower temperatures. It is known, for example, that the synthetic rubberlike materials produced by emulsion polymerization at temperatures substantially below 122° F. are markedly superior in important physical characteristics such as tensile strength, elongation, flex life, resilience and resistance to accelerated aging to similar materials prepared within the conventional temperature ranges.

It has heretofore been deemed impractical, however, to produce synthetic rubberlike materials in commercial quantities by the low temperature emulsion polymerization of vinyl compounds. The utilization of such a low temperature process has previously resulted in a very substantial increase in the reaction time required to produce a desirable yield of polymeric materials. Even after extended periods of reaction, only relatively low yields of such polymeric materials were normally obtained. The discovery of a process whereby the advantages which attend the low temperature emulsion polymerization of vinyl compounds might be availed of, and a high quality rubbery polymeric product obtained in good yield after a reasonable period of reaction has, therefore, constitued a major problem in the art.

Now in accordance with this invention it has been discovered that the polymerization of organic compounds containing the $CH_2=C<$ group may be effected at temperatures below about 0° C. in aqueous emulsion in the presence of a water-soluble organic compound of low freezing point as antifreeze agent, an $\alpha,\alpha$-dialkylarylmethyl hydroperoxide as catalyst, an alkali metal hydrorosin acid salt as emulsifying agent, and an electromotive couple having a standard oxidation-reduction potential between about —1.0 and about —0.3 volt.

The standard oxidation-reduction potential to which reference is made herein is the value in volts of the electrical potential of the couple in question determined at 25° C. under a pressure of one atmosphere with solutions of one molal activity referred to the potential of the hydrogen-hydrogen ion couple as zero. The sign of the oxidation-reduction potential value is negative when the reduced form of the couple is a weaker reducing agent than hydrogen.

One of the components of the activators of this invention may be a metallic reducing agent, and the term "metallic reducing agent" is utilized herein to designate all of those materials which contain metallic atoms and which are capable of acting as reducing agents, i. e., which are capable of donating an electron to other components of the reaction mixture. Thus, there is embraced by the term "metallic reducing agent" not only the free metallic ions such as the ferrous ion (Fe++) but also complexes of such metallic ions such as the ferrous pyrophosphate complex. Likewise included are metallic compounds which are substantially completely insoluble but which nevertheless act as reducing agents such as, for example, nickel hydroxide $(Ni(OH)_2)$ which forms the couple

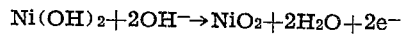

$Ni(OH)_2 + 2OH^- \rightarrow NiO_2 + 2H_2O + 2e^-$ the standard oxidation-reduction potential of which is —0.5 volt.

By the process of this invention there may be produced excellent yields of synthetic rubberlike materials after relatively short periods of reaction. Furthermore, the rubbery polymers so obtained are characterized by superior physical properties as compared with similar materials prepared in like manner at substantially higher temperatures or in the presence of conventional fatty acid soaps alone as emulsifying agents.

The following examples are illustrative of the production of polymers by emulsion polymerization at low temperatures in accordance with this invention. The a,a-dimethylbenzyl hydroperoxide catalyst employed in these examples was prepared by the air oxidation of cumene. It contained 70.0% a,a-dimethylbenzyl hydroperoxide, 17.0% a,a-dimethylbenzyl alcohol and 13% acetophenone and other secondary reaction products. All parts are by weight unless otherwise indicated.

*Example 1*

Polymers of butadiene-1,3 alone and styrene alone and copolymers of butadiene-1,3 and styrene, and of butadiene-1,3 and methyl isopropenyl ketone were prepared. In this and the following examples, the polymerizations were carried out in a glass container, and the reaction mixture was formulated from the following ingredients in the proportions indicated.

| Ingredients: | Parts |
|---|---|
| Monomers | 100 |
| Water | 150 |
| Methanol | 50 |
| a,a-Dimethylbenzyl hydroperoxide (catalyst) | 0.2 |
| Tertiary Mercaptans[1] (modifier) | 0.2 |
| Potassium salt of hydrogenated rosin (emulsifier) | 5.0 |
| Activator: | |
| ($FeSO_4.7H_2O$) | 0.36 |
| ($K_4P_2O_7$ or | 0.30 |
| $Na_4P_2O_7.10H_2O$) | 0.40 |

[1] A tertiary mercaptan blend composed of $C_{12}$, $C_{14}$ and $C_{16}$ tertiary mercaptans in the ratio of 3:1:1.

When potassium pyrophosphate was utilized to prepare the ferrous pyrophosphate activator, 12 parts of potassium pyrophosphate ($K_4P_2O_7$) was dissolved in 300 parts of water and to the resulting solution then was added dropwise in an inert atmosphere and with vigorous agitation a solution of 14.4 parts of ferrous sulfate heptahydrate ($FeSO_4.7H_2O$) in 93 parts of water. The activator so prepared was stored under nitrogen and placed in an ice chest at 0° C. until utilized.

When sodium pyrophosphate was used to prepare the activator, 32 parts of sodium pyrophosphate decahydrate ($Na_4P_2O_7.10H_2O$) was dissolved in 1400 parts of water, and to the resulting solution then was added dropwise in an inert atmosphere and with vigorous agitation 200 parts of a solution of 144 parts of ferrous sulfate heptahydrate in 1000 parts of water. At the end of the addition the resulting suspension was centrifuged under an inert atmosphere until the ferrous pyrophosphate separated out, the clear supernatant liquid then being decanted and the ferrous pyrophosphate then being resuspended in a sufficient amount of fresh water so that 10 parts of the activator suspension was equivalent in iron content to 0.36 part of $FeSO_4.7H_2O$. This activator was stored at room temperature under an atmosphere of nitrogen and cooled to 0° C. just prior to using.

The potassium salt of hydrogenated rosin which was employed as an emulsifier was prepared by first dissolving 4.51 parts of hydrogenated rosin in 46.2 parts of methanol in the glass reaction vessel in which the polymerization reaction was ultimately effected, and then adding to this methanol solution of hydrogenated rosin the chemically equivalent amount of 0.5 N aqueous potassium hydroxide. The potassium hydroxide solution was followed by the balance of the 150 parts of water specified in the above recipe with the exception of about 10 parts which were reserved for the activator solution. Thus, the emulsifier was obtained in the desired concentration in suspension in a portion of the water-methanol antifreeze medium. The hydrogenated rosin employed was prepared by the hydrogenation of N wood rosin the the presence of a palladium-on-charcoal catalyst. The product so obtained was 98.6% saturated, was characterized by an acid number of 164 and contained 0.8% dihydroabietic acid.

After the emulsifying agent had been prepared, the a,a-dimethylbenzyl hydroperoxide catalyst was dissolved in the balance (3.8 parts) of the methanol and the resultant solution charged to the reaction vessel. The monomers, if volatile, were then mixed in slight excess with the mercaptan modifier and this mixture added to the contents of the reaction vessel. The excess monomers were permitted to vaporize at room temperature to sweep the air out of the reaction vessel. If nonvolatile monomers were utilized, the monomers and modifier were mixed and the air contained in the reaction vessel was swept out with nitrogen. After the air had been removed therefrom, the pressure within the reaction vessel was then adjusted to 30 p. s. i. with nitrogen, cooled to a temperature of 0° C., and the pressure again adjusted to 30 p. s. i. with nitrogen. The vessel was then agitated at a temperature of −15° C. for one hour. Ten parts of the previously described activator which had been prepared using potassium pyrophosphate and cooled to a temperature of about 0° was then added and the pressure within the reaction vessel was once more adjusted to 30 p. s. i. with nitrogen. This activator contained the balance of the water specified in the above recipe. After the activator was added, the reaction vessel was again agitated at a temperature of −15° C. for the duration of the reaction period. Samples of the contents of the reaction vessel were withdrawn 16½ hours, 22½ hours and 41 hours after the addition of the activator. By this means was obtained a known weight of the latex which had been formed after each reaction period. To each latex sample so obtained was added a small portion of 2% aqueous hydroquinone solution to prevent further polymerization from occurring. The latex samples were then dried to constant weight to determine the percentage conversion of the monomer to polymer. Corrections were made for the hydroquinone added and for the nonpolymer solids. The results of these determinations are recorded in Table 1.

TABLE 1

| Monomers, Weight Ratio | Parts | Percent of Monomers Converted to Polymers | | | Remarks |
|---|---|---|---|---|---|
| | | 16.5 hrs. | 22.5 hrs. | 41 hrs. | |
| Butadiene-1,3 | 100 | 23 | 34 | 66 | No modifier employed. |
| Do | 100 | 25 | 37 | 70 | Do. |
| Styrene | 100 | 86 | 89 | | Do. |
| Do | 100 | 78 | 90 | | Do. |
| Butadiene-1,3 | 86 | 32 | 47 | 81 | Do. |
| Styrene | 14 | | | | |
| Butadiene-1,3 | 72 | 36 | 51 | 81 | Do. |
| Styrene | 28 | | | | |
| Butadiene-1,3 | 50 | 65 | 82 | | Do. |
| Styrene | 50 | | | | |
| Butadiene-1,3 | 25 | 95 | 97 | | Do. |
| Styrene | 75 | | | | |
| Butadiene-1,3 | 70 | 62 | 67 | | Do. |
| Methyl Isopropenyl Ketone | 30 | | | | |
| Butadiene-1,3 | 70 | 70 | 80 | | Do. |
| Methyl Isopropenyl Ketone | 30 | | | | |

The data recorded in the above table clearly indicate that various types of vinyl compounds may be separately polymerized or jointly copolymerized with similar compounds in accordance with the process of this invention to produce synthetic materials in good yield in a relatively short time. All of the products so obtained were characterized by excellent physical properties.

case, however, the emulsifying agent was formulated from mixtures of tetrahydroabietic acid with abietic acid and with dihydroabietic acid in the proportions indicated in Table 2. A similar emulsifying agent was formulated from substantially pure hydroxytetrahydroabietic acid alone. The various emulsifying agents were all quite effective in the emulsion polymerization process of this invention as indicated in Table 2.

TABLE 2

| Rosin Acids, Percent by Weight in Emulsifying Agent Formation | | | | Percent Conversion of Monomer to Copolymer | | |
|---|---|---|---|---|---|---|
| Tetrahydro-abietic | Abietic | Dihydro-abietic | Hydroxy-tetrahydro-abietic | After 16.5 hrs. reaction | After 22.5 hrs. reaction | After 41 hrs. reaction |
| 89.5 | 10.5 | 0 | 0 | 37 | 51 | 76 |
| 68 | 0 | 32 | 0 | 40 | 60 | ------ |
| 0 | 0 | 0 | 100 | 28 | ------ | 70 |

*Example 2*

Seventy-two parts of butadiene-1,3 and 28 parts of styrene were copolymerized in the same manner as that described in Example 1. In this case, however, the activator used was prepared from sodium pyrophosphate as described in Example 1. Likewise, although it was prepared in substantially the same manner, the hydrogenated rosin from which the emulsifying agent was formulated was slightly different in physical properties from that described in Example 1. The hydrogenated rosin employed in this instance was 99% saturated and was characterized by an acid number of 165. It contained 0.15% dihydroabietic acid.

In the above-described manner, 49% of the butadiene-1,3 and styrene monomers originally present in the reaction mixture was converted to a copolymeric rubbery product after 16.5 hours of reaction while 68% of the monomers was so copolymerized after 22.5 hours of reaction.

*Example 3*

Seventy-two parts of butadiene-1,3 and 28 parts of styrene were copolymerized in the same manner as that described in Example 1. In this case, however, the emulsifying agent was prepared from substantially pure tetrahydroabietic acid and the activator employed was prepared from ferrous sulfate heptahydrate ($FeSO_4.7H_2O$) and sodium pyrophosphate decahydrate ($Na_4P_2O_7.10H_2O$)

in the manner described in Example 1.

In the above-described manner, conversion of 51% of the monomers to a rubbery copolymeric material was effected after 16.5 hours of reaction while a conversion of 68% of the monomers to such polymeric material was effected after 22.5 hours of the reaction.

*Example 4*

Seventy-two parts of butadiene-1,3 and 28 parts of styrene were copolymerized in the same manner as that described in Example 3. In this case, however, the emulsifying agent was formulated from dihydroabietic acid. By this means, 42% of the original monomers was converted to a copolymeric material after 22.5 hours of reaction. Seventy-one per cent of the monomers was so copolymerized after 41.5 hours of reaction.

*Example 5*

Seventy-two parts of butadiene-1,3 and 28 parts of styrene were copolymerized in the same manner as that described in Example 1. In this

*Example 6*

Seventy-two parts of butadiene-1,3 and 28 parts of styrene were copolymerized in the manner similar to that described in Example 1. In this case, however, 0.2 part of potassium sulfate was included in the reaction mixture and an aqueous paste of the potassium salt of the hydrogenated rosin employed as an emulsifying agent was utilized. This paste contained 67.6% total solids and was characterized by an acid number of 8.4. This aqueous paste was diluted with 46.2 parts of the methanol portion of the antifreeze medium and placed in a reaction vessel. From this point on, the copolymerization reaction was conducted in the same manner as that described in Example 1. By this means, 45% of the original monomers was converted to polymeric materials after 16.5 hours of reaction. After 22.5 hours of reaction, 61% of the monomers was copolymerized.

The hydrogenated rosin from which the aqueous paste soap utilized in this example was formulated and prepared by the hydrogenation of commercial abietic acid. It was characterized by an acid number of 162, was 98.6% saturated and contained 0.3% dihydroabietic acid.

*Example 7*

Seventy-two parts of butadiene-1,3 and 28 parts of styrene were copolymerized in the same manner as that described in Example 1. In this case, however, 1.5 parts of 1-sorbose were included in the reaction mixture. Likewise, the hydrogenated rosin from which the emulsifying agent was formulated, although prepared from N wood rosin in essentially the same manner as that employed in Example 1, was 96.5% saturated, was characterized by an acid number of 163 and contained 1.7% dihydroabietic acid. By this means, 44% of the monomers was converted to copolymeric rubberlike materials after 16.5 hours of reaction. After 22.5 hours of reaction, 63% of the monomers was so converted to synthetic rubberlike materials.

*Example 8*

Seventy-two parts of butadiene-1,3 and 28 parts of styrene were copolymerized in the same manner as that described in Example 2. In this case, however, the emulsifying agent was prepared from the middle fraction of the distilled hydrogenated rosin prepared by heating N wood rosin the presence of hydrogen and a Raney nickel catalyst. This middle fraction represented about 65% of the original rosin and was characterized by an acid number of 182.5 and a boiling point of 201–214° C. at 1.0 mm. It contained 1.5% abietic acid and 11.9% of dihydroabietic acid. By this means, 44% of the monomers was converted to a rubberlike copolymeric product after 41 hours of reaction.

*Example 9*

Seventy-two parts of butadiene-1,3 and 28 parts of styrene were copolymerized in the same manner as that described in Example 2. In this case, however, 0.35 part of potassium sulfate was added to the reaction mixture. By this means, 50% of the monomers was converted to a rubberlike polymer after 16.5 hours of reaction. After 22.5 hours, 67% of the monomers was polymerized. The product obtained as a consequence of the use of the potassium sulfate was characterized by a less viscous latex as compared with those prepared in a similar manner in the absence of potassium sulfate. This product was more easily handled in conventional polymerization equipment than similar materials of more viscous nature.

*Example 10*

Seventy-five parts of butadiene-1,3 and 25 parts of acrylonitrile were polymerized in the same manner as that described in Example 6. In this case, however, a,a-dimethyl-p-methylbenzyl hydroperoxide was employed as the catalyst. Likewise, in this case the emulsifying agent was prepared by hand mixing 3.34 parts of the potassium salt of hydrogenated rosin in the form of an aqueous paste with 1.40 parts of lauric acid, diluting the mixture with 46.2 parts of methanol and adding a sufficient amount of 0.5 N potassium hydroxide to neutralize the lauric acid. The emulsifying agent so formed, which constituted a mixture of fatty and hydrogenated rosin acids soaps, was charged to the polymerization reaction vessel and from this point on the polymerization was conducted in the same manner as that described in Example 1. By this means 93% of the original monomers was converted to a polymeric material after 24.3 hours of reaction.

The paste of the potassium salt of hydrogenated rosin was prepared by neutralizing a hydrogenated rosin with potassium hydroxide and was characterized by an acid number of 11.0 and a total solids content of 77.7. The hydrogenated rosin from which this paste was formulated was prepared by hydrogenating commerical abietic acid in the presence of a palladium-on-charcoal catalyst. It was characterized by an acid number of 164.0, was 98.6% saturated and contained no abietic or dihydroabietic acid.

The hydrorosin acid emulsifying agents which are operable in the process of this invention include the alkali metal salts of hydrogenated rosin or hydrogenated rosin acids and mixtures of these salts with similar salts of fatty acids. Relative to any of these emulsifying agents it is preferable to use the potassium salt. It is well known that rosin is a mixture of isomeric acids, best known of which are the abietic- and pimaric-type acids. The relative proportions in which these and the other isomeric acids occur in a particular sample of rosin depend upon the source thereof. Thus, wood rosin contains predominantly abietic acid while American gum rosin contains predominantly l-pimaric acid and French gum rosin contains predominantly d-pimaric acid. Any of these rosins may be treated to reduce their unsaturation. By hydrorosin acids so obtained are all equivalently operable as compounding ingredients for the emulsifying agents of this invention. The several isomeric acids found in the various types of rosin likewise may be separated and hydrogenated in pure form or the hydrogenated rosin acids may be separated after hydrogenation of the rosin if desired. These individual hydrorosin acids are, of course, all operable starting materials from which may be prepared emulsifying agents useful in the process of the invention. Likewise, substituted hydrorosin acids such as hydroxytetrahydroabietic acid may be employed. It is necessary that the hydrogenated rosin or hydrogenated rosin acids employed be at least 40% saturated with hydrogen. A preferable range of saturation is from about 50% to 100%, and a particularly applicable range is from about 90 to 100%. It is preferred that the hydrogenated rosin or rosin acids be purified by distillation, crystallization or other suitable means prior to use in the preparation of the emulsifying agents to remove any materials which might inhibit polymerization by peroxide catalysts.

The hydrogenation of rosin or rosin acids may be carried out by contacting the rosin or rosin acid in the fluid state with hydrogen in the presence of an active base metal hydrogenation catalyst such as activated nickel, Raney nickel, copper chromite, cobalt, etc. under pressure, for example, 200 to 15,000 p. s. i. and at a temperature of from about 125° C. to about 225° C. for about 0.5 to 5 hours. A highly reactive palladium catalyst, such as palladium on activated carbon, or a platinum or platinum oxide catalyst may also be employed in which case the reaction is customarily effected at room temperature under relatively low pressure in the presence of an inert reaction medium such as acetic acid. Many variations of the above-described hydrogenation reaction may be utilized.

As hereinbefore mentioned, either gum or wood rosin or the rosin acids present therein may be hydrogenated. The rosin may be refined prior to its hydrogenation by any suitable method such as distillation, heat-treatment with or without a catalyst, solvent extraction as with furfural, phenol and the like, or by treatment with an absorbent such as fuller's earth, activated carbon and similar materials or by any other suitable method.

As previously indicated, the hydrogenated rosin soaps may be utilized in conjunction with fatty acid soaps as emulsifying agents in the process of this invention. Thus, emulsifying agents containing up to 50% fatty acid soaps by weight may be utilized. A preferable range of concentration of fatty acid soaps is from about 10% to about 30% of the weight of the emulsifying agent. It is preferable that the fatty acid soaps employed in this invention be prepared from long-chain fatty acids which have from about 12 to about 18 carbon atoms in the molecule. A readily available source of such a mixture of fatty acids and rosin acids is tall oil. Tall oil is a by-product from the manufacture of paper pulp by the digestion of wood with alkaline liquors such as alkaline solutions of sodium sulfide. Crude tall oil consists of a mixture of rosin and fatty acids in roughly equal proportions in conjunction with minor amounts of neutral, unsaponifiable materials consisting primarily of plant sterols.

Tall oil may generally be hydrogenated by the same processes as those previously described for the hydrogenation of rosin. It is often advantageous to refine the tall oil prior to hydrogenation. Various methods such as those previously described for the refining of rosin are satisfactory and yield products which are substantially lighter in color than the crude tall oil and which are more nearly odorless. Such refined tall oils may or may not differ greatly in composition from the crude material depending upon the conditions used. Distillation, for example, may be carried out in such a manner that it is possible to separate a fraction consisting almost exclusively of fatty acids and other fractions consisting predominantly of rosin acids. For utilization in the preparation of the emulsifying agents of this invention, however, it is usually desirable that tall oil be distilled to effect separation only of certain high-boiling constituents which are normally present and which exert inhibitory effects on both the hydrogenation and polymerization processes. By this procedure the ratio of rosin acids to fatty acids remains essentially unchanged. Fractionation into the substantially pure fatty acid and rosin acid constituents by such distillation is unnecessary. The distillation should be carried out at reduced pressure, for example, from about 0.5 to about 25 mm. of mercury. The distillation temperatures which are operable within these pressure ranges will vary from about 150° C. to about 300° C.

Although those materials in tall oil which exhibit an inhibitory effect upon polymerization reactions can be at least partially removed by distillation or other refining procedures, it is preferable to remove them by pretreating the tall oil with a spent catalyst resulting from previous tall oil hydrogenations. Spent palladium and nickel catalysts are particularly useful in such a treatment and the refined tall oil can then be hydrogenated more readily than the crude product. The pretreatment with spent catalysts may be carried out under the same conditions as those used in the hydrogenation step.

The hydrogenated rosin, hydrogenated rosin acids and mixtures of these materials with fatty acids may be neutralized with basic compounds of the alkali metals, such as the hydroxides and carbonates of sodium and potassium, to produce the emulsifying agents which are operable in the process of this invention. These emulsifying agents may be prepared either in situ in the reaction vessel in which the polymerization is effected, or externally. In any event, it is preferable that the emulsifying agent be admixed with the other reactants in the form of a solution or suspension in a portion of the antifreeze medium in which the polymerization is carried out. These emulsifying agents are preferably prepared by adding an aqueous solution of the alkali metal compound utilized to a solution of the hydrogenated rosin acid material in a water-soluble organic compound, such as methanol, which may constitute a portion of the antifreeze medium in which the emulsion polymerization reaction is effected. However, the emulsifying agent may be prepared by reacting an aqueous solution of the alkali metal compound with the hydrogenated rosin material to form an aqueous paste containing about 50% to 80% solids as illustrated by Example 6. This paste is preferably diluted, prior to admixture with the other ingredients of the reaction mixture, with a water-soluble organic compound which may constitute a portion of the antifreeze medium. If desired, however, the paste may be diluted with hot water to a concentration of about 10% by weight, thus forming a clear hot soap solution. If desired, the alkali metal salts of hydrogenated rosin and hydrogenated rosin acids may, of course, be mixed with preformed fatty acid soaps to form the emulsifying agents with which this invention is concerned.

Regardless of the method by which the emulsifying agent is prepared, it is desirable that the hydrogenated rosin or hydrogenated rosin acids or mixtures thereof with fatty acids which are employed be reacted with about the chemically-equivalent amount of basic alkali metal compound. That is, it is desirable that the emulsifying agent constitute an essentially neutral product containing no substantial excess of either alkali or hydrogenated rosin acid or fatty acid.

The emulsifying agents hereinbefore described may be employed in an amount equivalent to from about 0.5% to about 5% based on the total emulsion polymerization reaction mixture. A preferred range on this basis is from about 1% to about 2% of the weight of the reaction mixture. The concentration of the emulsifying agent in the aqueous phase may be from about 1% to about 5%, preferably from about 2% to about 3%. Based on the weight of the monomers originally present, the emulsifying agent may be utilized in an amount equivalent to from about 1.5% to about 15% of the weight thereof and preferably in an amount equivalent to from about 4% to about 6% of the weight thereof.

The utilization of hydrogenated rosin soaps as emulsifying agents in the polymerization of vinyl compounds is desirable in that the polymers thereby produced are characterized by superior physical properties, particularly in the case of rubbery polymers. These hydrogenated rosin soap emulsifying agents are particularly desirable in low temperature emulsion polymerization reactions for the reason that these emulsifying agents reduce the tendency of the reaction mixture to gel as the temperature is lowered. Furthermore, these unique and desirable advantages obtain when the hydrogenated rosin soaps are employed in conjunction with fatty acid soaps as is the case, for example, when the emulsifying agents are prepared from hydrogenated tall oil.

The activators which are operable in the process of this invention comprise those electromotive couples having a standard oxidation-reduction potential between about −1.0 and about −0.3 volt, preferably between about −0.3 and about −0.5 volt. Such activators should be capable of reducing the $\alpha,\alpha$-dialkylarylmethyl hydroperoxide catalyst to a corresponding aromatic ketone in better than about 25% yield, for example, $\alpha,\alpha$-dimethylbenzyl hydroperoxide to acetophenone, in from about 0.25 hour to about 50 hours. Preferable are those electromotive couples containing a metallic reducing agent, such as the ferrous ($Fe^{++}$) ion, which forms a couple in the reaction mixture with an analogous material of higher oxidation state, such as the ferric ($Fe^{+++}$) ion. Thus, suitable activators for use in this invention may be prepared by adding an aqueous solution of ferrous sulfate heptahydrate ($FeSO_4.7H_2O$) with agitation in an inert atmosphere to an aqueous solution of sodium pyrophosphate decahydrate ($Na_4P_2O_7.10H_2O$). When the addition of the ferrous sulfate is completed, the ferrous pyrophosphate activator formed may be washed, for example, by centrifuging the reaction mixture to collect the ferrous pyrophosphate, decanting the supernatant liquid, and resuspending the ferrous pyrophosphate in pure distilled water. The ferrous pyrophosphate should be maintained under an inert atmosphere to prevent the air oxidation thereof and may be cooled to a temperature of about 0° C. prior to incorporation into the low temperature emulsion polymerization system with which this invention is concerned.

Suitable activators may be prepared in like manner from potassium pyrophosphate. The activators so prepared are advantageous in that the ferrous pyrophosphate formed may be utilized without the washing which is desirable in the case of a similar activator prepared from sodium pyrophosphate. Thus, the crude reaction mixture resultant from the addition of the ferrous sulfate solution to the potassium pyrophosphate solution may be employed. However, the activator prepared in this manner is subject to rather rapid deterioration at room temperature, and, accordingly should be stored at a temperature of about 0° C.

In so far as the preparation of ferrous pyrophosphate activators is concerned, the pyrophosphate compound and the ferrous salt utilized should be employed in such proportions that there is present in the reaction mixture in which the activator is formed from about 0.3 to about 2.5 chemical equivalents of the pyrophosphate for each chemical equivalent of the ferrous salt. A preferable range is from about 0.8 to about 2.0 chemical equivalents of pyrophosphate per chemical equivalent of ferrous salt. Particularly desirable is the presence of about 1.4 chemical equivalents of pyrophosphate for each chemical equivalent of ferrous salt. Soluble ferrous salts other than ferrous sulfate, such as, for example, ferrous chloride, may, of course, be utilized in the preparation of the ferrous activators which are operable in the process of this invention. Likewise, similar salts of analogous metals may be employed. It is necessary, of course, that the metallic ion component of these salts be in a reduced oxidation state. Furthermore, the ferrous and analogous metallic ions derived from these salts may be complexed with anions other than the pyrophosphate ion to form operable activators. For example, citrate ions may be so utilized.

The activator may be used in such an amount that there is provided from about 0.1 to about 3.0 electrons for each hydroperoxy radical. A preferable range for freshly prepared activators is from about 0.8 to about 1.0 electron per hydroperoxy radical, and that for activators aged at room temperature or by heating for a short time at elevated temperatures is from about 0.8 to about 2.0 electrons per hydroperoxy radical.

The catalysts which are operable in the polymerization process of this invention have been illustrated in the examples by $\alpha,\alpha$-dimethylbenzyl and $\alpha,\alpha$-dimethyl-p-methylbenzyl hydroperoxides. Such hydroperoxides are generally known as $\alpha,\alpha$-dialkylarylmethyl hydroperoxides, and they may be prepared by the oxidation of alkyl-substituted aromatic organic compounds having the structural formula

in which $R_1$ and $R_2$ represent alkyl groups and Ar represents a substituent selected from the group consisting of aryl and alkaryl groups. The oxidation may be carried out in the liquid phase utilizing air or molecular oxygen as the oxidizing agent. A preferred method of preparing these hydroperoxides involves the liquid phase oxidation of the alkyl-substituted aromatic organic compounds having the above structural formula by passing an oxygen-containing gas through the compounds at a temperature between about 25° C. and about 95° C. in the presence of an aqueous alkali. The concentration of the aqueous alkali may be between about 1% and about 35% although it is preferable to use concentrations of about 2% to about 8%. Vigorous agitation is desirable during the oxidation reaction.

As illustrative of the alkyl-substituted aromatic organic compounds which may be oxidized, p-cymene, cumene, and diisopropylbenzene may be mentioned. These compounds lead to $\alpha,\alpha$-dimethyl-p-methylbenzyl, $\alpha,\alpha$-dimethylbenzyl, and $\alpha,\alpha$-dimethyl-p-isopropylbenzyl hydroperoxides, respectively. Also, in the case of diisopropylbenzene, $\alpha,\alpha,\alpha',\alpha'$-tetramethyl-p-xylylene dihydroperoxide may be formed. These compounds also may be named as aryl(dialkyl)methyl hydroperoxides; for example, $\alpha,\alpha$-dimethylbenzyl hydroperoxide may be designated as phenyl(dimethyl)methyl hydroperoxide. The aryl and substituted aryl groups need not be derived from benzene, as is the case in the aforementioned compounds, for compounds containing aromatic nuclei derived from naphthalene, anthracene, phenanthrene, and the like also are operable when dissolved in a suitable solvent during the oxidation. The aryl group may be substituted with alkyl groups such as methyl, ethyl, propyl, isopropyl, butyl, isobutyl, tertiary butyl, and the like, the same alkyl groups also being representative of $R_1$ and $R_2$ in the structural formula. $R_1$ and $R_2$ may be either the same or different.

The amount of hydroperoxide which may be used in accordance with this invention may be between about 0.5% and about 20% based on the amount of solid emulsifying agent used. The preferable amount of hydroperoxide on this basis, however, is from about 2% to about 6%. Based on the monomers, the amount of hydroperoxide may be from about 0.001 to about 5.0%, a desirable range being from about 0.02 to about 1.5%, and the preferable amount of hydroperoxide on this basis being from about 0.1 to about 0.6%.

Aqueous solutions of water-soluble organic compounds of low freezing point may be employed as antifreeze media in the process of this invention. Thus, water solutions of the lower alkanols, such as methanol and ethanol, may be utilized. Also operable are water solutions of other alcohols, including polyfunctional alcohols such as glycerol or ethylene glycol. In fact, at quite low temperatures, better reaction rates are often obtained by the utilization as antifreeze agents of such polyfunctional molecules. If desired, water solutions of nonalcoholic compounds such as acetone and methyl acetate may be employed. In any particular instance, those skilled in the art will be able to select or formulate a reaction medium, the freezing point of which is below the temperature at which it is desired to effect a particular polymerization reaction. Such reactions may be readily carried out at temperatures of $-15°$ C. in a medium consisting of 3 parts of water and 1 part methanol. As previously indicated, it is advantageous prior to admixing the emulsifying agent with the other ingredients of the polymerization system to form a solution or suspension thereof in a portion of the antifreeze medium.

a-Hydroxy carbonyl compounds or compounds which react as a-hydroxy carbonyl compounds may be added to the other ingredients of the reaction mixture in the process of this invention. Thus, such compounds as fructose, glucose, lactose, sorbose, acetylacetone, ascorbic acid, benzoin, acetoin, propionoin, butyroin, isobutyroin, pivaloin and the like may be utilized. In general, those aldehydes and ketones containing a hydroxyl group on an adjacent carbon atom in an alkyl chain and having thereby in common the structural group

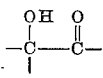

are operable in this invention. The preferable a-hydroxy aldehydes and ketones are those compounds which are known as reducing sugars.

Exemplary of the reducing sugars which may be used in accordance with this invention are the monosaccharides, including aldotrioses such as glycerose; ketotrioses such as dioxyacetone; aldotetroses such as erythrose and threose; ketotetroses such as erythrulose; aldopentoses such as arabinose, xylose, lyxose, and ribose, ketopentoses such as araboketose and xyloketose; aldohexoses such as glucose, galactose, mannose, gulose, idose, talose, allose and the like; ketohexoses such as fructose or levulose, sorbose and the like; and other reducing sugars including the disaccharides and trisaccharides such as maltose, lactose, and mannotriose. Also operable is the equimolecular mixture of fructose and glucose obtained through the hydrolysis of sucrose and known as invert sugar. As illustrative of the a-hydroxycarbonyl compounds in general, the amount of reducing sugar employed may vary from about 0.01 to about 6% of the weight of the monomers. A preferable range on this basis is from about 0.1 to about 3%. Particularly appropriate is that quantity of sugar equivalent to about 0.5% of the weight of the monomer.

It is desirable, particularly in the polymerization of those compounds leading to synthetic rubberlike materials, that there be included in the polymerization reaction mixture a modifying agent. The conventional modifying agents may be used in the process of this invention. Thus, the mercaptans normally so employed may be utilized, and the amount may be that usually used, for example, in the preparation of synthetic rubbers. It is desirable, however, that the mercaptan modifier be tertiary for the reason that improved modification of the rubber is thereby obtained. Primary mercaptans may, however, be employed if desired. It is of significance, however, that by the process of this invention there may be produced benzene-soluble, high viscosity polymers of conjugated butadienes and of copolymers of conjugated butadienes containing about 50% or more of the butadiene without the utilization of a modifier. This result is novel since omission of the modifier in the polymerization of such materials has in the past resulted in formation of insoluble polymers and copolymers. The unmodified conjugated butadiene polymers and copolymers of this invention are valuable as adhesives, paper-treating agents and the like.

The emulsion polymerization of the vinyl, vinylene and vinylidene compounds may be effected in accordance with this invention at temperatures up to about 0° C. Temperatures as low as −70° C. may be employed if desired. The preferable temperature range is from about −30° C. to about −5° C.

If desired, small quantities of inorganic salts such as potassium sulfate may be added to the reaction mixture to reduce the viscosity of the latices of the polymers obtained. The utilization of large quantities of such salts, however, adversely affects the rate and extent of polymerization. A preferably range of concentration of such salts is from about 0.1 to about 0.5% of the weight of the monomers. Except as otherwise indicated, the conventional emulsion polymerization techniques, concentrations of reactants and reaction conditions may be utilized in practicing the process of this invention.

Compounds which may be advantageously polymerized in antifreeze media by the process of this invention include the conjugated butadienes such as butadiene-1,3, isoprene, 2,3-dimethyl butadiene-1,3, chloroprene, piperylene, monomer mixtures of two or more of these conjugated butadienes such as a mixture of butadiene-1,3 and 2,3-dimethyl butadiene-1,3 and monomer mixtures of one or more of these conjugated butadienes with vinyl compounds such as styrene, p-chlorostyrene, p-methoxystyrene, vinyl naphthalene, acrylic acid, methacrylonitrile, methyl methacrylate, methyl acrylate, methyl vinyl ketone, methyl isopropenyl ketone, methyl vinyl ether and the like. The process of this invention is particularly applicable to the preparation of the copolymers of butadiene and styrene or acrylonitrile, isoprene and styrene or acrylonitrile, and other rubberlike copolymers as well as in the preparation of polymers such as polyvinyl chloride, polyvinyl acetate, polystyrene, polymethylmethacrylate, polyvinylidene chloride, polyvinyl pyridine, and the various other addition polymers which may be prepared by the emulsion technique.

It has been recognized by the art that superior rubberlike materials might be prepared from vinyl, vinylene and vinylidene compounds by emulsion polymerization at low temperatures. Heretofore, however, such processes have been found to entail unduly long reaction periods and to result in low yields of polymeric materials. The process of this invention, utilizing as emulsifying agents the alkali metal salts of hydrorosin acids, permits the attainment of satisfactory yields of superior polymeric materials in reasonable lengths of time. The combination of the particular catalysts, namely, the $a,a$-dialkylarylmethyl hydroperoxides, with the particular activators and emulsifying agents results in good yields of polymers from low temperature polymerizations, and particularly in the case of the rubberlike polymers, such as those derived from the copolymerization of butadiene and styrene, imparts desirable physical properties to the polymers.

What I claim and desire to protect by Letters Patent is:

1. The process which comprises polymerizing an organic compound containing the $CH_2=C<$ group at a temperature between about −5° C. and −70° C. in aqueous emulsion in the presence of a water-soluble organic compound of low freezing point as antifreeze agent, an $a,a$-dialkylarylmethyl hydroperoxide as catalyst, between about 0.5% and about 5% of an alkali metal hydrorosin acid salt wherein said hydrorosin acid is at least about 90% saturated with hydrogen as emulsifying agent, and a metal electromotive couple having a standard oxidation-reduction potential between about −1.0 and about −0.3 volt as activator.

2. The process which comprises polymerizing an organic compound containing the $CH_2=C<$ group at a temperature between about −5° C. and −70° C. in aqueous emulsion in the presence of a water-soluble organic compound of low freezing point as antifreeze agent, an α,α-dialkylarylmethyl hydroperoxide as catalyst, between about 0.5% and about 5% of an alkali metal hydrorosin acid salt wherein said hydrorosin acid is at least about 90% saturated with hydrogen as emulsifying agent, and a metal electromotive couple having a standard oxidation-reduction potential between about −0.8 and about −0.5 volt as activator.

3. The process which comprises polymerizing a conjugated butadiene at a temperature between about −5° C. and −70° C. in aqueous emulsion in the presence of a water-soluble organic compound of low freezing point as antifreeze agent, an α,α-dialkylarylmethyl hydroperoxide as catalyst, between about 0.5% and about 5% of an alkali metal hydrorosin acid salt wherein said hydrorosin acid is at least about 90% saturated with hydrogen as emulsifying agent, and a metal electromotive couple having a standard oxidation-reduction potential between about −1.0 and about −0.3 volt as activator.

4. The process which comprises polymerizing butadiene-1,3 at a temperature between about −5° C. and −70° C. in aqueous emulsion in the presence of a water-soluble organic compound of low freezing point as antifreeze agent, an α,α-dialkylarylmethyl hydroperoxide as catalyst, between about 0.5% and about 5% of an alkali metal hydrorosin acid salt wherein said hydrorosin acid is at least about 90% saturated with hydrogen as emulsifying agent, and a metal electromotive couple having a standard oxidation-reduction potential between about −1.0 and about −0.3 volt as activator.

5. The process which comprises copolymerizing a mixture of butadiene-1,3 and styrene at a temperature between about −5° C. and −70° C. in aqueous emulsion in the presence of a water-soluble organic compound of low freezing point as antifreeze agent, an α,α-dialkylarylmethyl hydroperoxide as catalyst, between about 0.5% and about 5% of an alkali metal hydrorosin acid salt wherein said hydrorosin acid is at least about 90% saturated with hydrogen as emulsifying agent, and a metal electromotive couple having a standard oxidation-reduction potential between about −1.0 and about −0.3 volt as activator.

6. The process which comprises copolymerizing a mixture of butadiene-1,3 and acrylonitrile at a temperature between about −5° C. and −70° C. in aqueous emulsion in the presence of a water-soluble organic compound of low freezing point as antifreeze agent, an α,α-dialkylarylmethyl hydroperoxide as catalyst, between about 0.5% and about 5% of an alkali metal hydrorosin acid salt wherein said hydrorosin acid is at least about 90% saturated with hydrogen as emulsifying agent, and a metal electromotive couple having a standard oxidation-reduction potential between about −1.0 and about −0.3 volt as activator.

7. The process which comprises polymerizing an organic compound containing the $CH_2=C<$ group at a temperature between about −5° C. and −70° C. in aqueous emulsion in the presence of a water-soluble organic compound of low freezing point as antifreeze agent, α,α-dimethylbenzyl hydroperoxide as catalyst, between about 0.5% and about 5% of an alkali metal hydrorosin acid salt wherein said hydrorosin acid is at least about 90% saturated with hydrogen as emulsifying agent, and a metal electromotive couple having a standard oxidation-reduction potential between about −1.0 and about −0.3 volt as activator.

8. The process which comprises polymerizing an organic compound containing the $CH_2=C<$ group at a temperature between about −5° C. and −70° C. in aqueous emulsion in the presence of a water-soluble organic compound of low freezing point as antifreeze agent α,α-dimethyl-p-methylbenzyl hydroperoxide as catalyst, between about 0.5% and about 5% of an alkali metal hydrorosin acid salt wherein said hydrorosin acid is at least about 90% saturated with hydrogen as emulsifying agent, and a metal electromotive couple having a standard oxidation-reduction potential between about −1.0 and about −0.3 volt as activator.

9. The process which comprises polymerizing an organic compound containing the $CH_2=C<$ group at a temperature between about −5° C. and −70° C. in aqueous emulsion in the presence of a water-soluble organic compound of low freezing point as antifreeze agent, α,α-dimethyl-p-isopropylbenzyl hydroperoxide as catalyst, between about 0.5% and about 5% of an alkali metal hydrorosin acid salt wherein said hydrorosin acid is at least about 90% saturated with hydrogen as emulsifying agent, and a metal electromotive couple having a standard oxidation-reduction potential between about −1.0 and about −0.3 volt as activator.

10. The process which comprises copolymerizing a mixture of butadiene-1,3 and styrene at a temperature between about −5° C. and −70° C. in aqueous emulsion in the presence of a water-soluble organic compound of low freezing point as antifreeze agent, an α,α-dimethyl-p-isopropylbenzyl hydroperoxide as catalyst, between about 0.5% and about 5% of an alkali metal hydrorosin acid salt wherein the said hydrorosin acid is at least about 90% hydrogenated as emulsifying agent, and a metal electromotive couple having a standard oxidation reduction potential between about −0.8 and about −0.5 volt as activator.

EDWIN J. VANDENBERG.

References Cited in the file of this patent

UNITED STATES PATENTS

| Number | Name | Date |
|---|---|---|
| 2,388,477 | Fryling | Nov. 6, 1945 |
| 2,535,557 | Walton | Dec. 26, 1950 |
| 2,546,220 | Fryling et al. | Mar. 27, 1951 |
| 2,581,402 | Fryling | Jan. 8, 1952 |

OTHER REFERENCES

Shearon, Jr., et al., Ind. & Eng. Chem., May 1948, pp. 769–777.

Vandenberg et al., Ind. & Eng. Chem., May 1948, pp. 932–937.